(12) United States Patent
Thiebaut

(10) Patent No.: US 11,732,686 B2
(45) Date of Patent: Aug. 22, 2023

(54) REPLACEMENT INSERT FOR REPAIR OF A JOINT CONNECTING A WIND TURBINE ROTOR BLADE TO A ROTOR HUB

(71) Applicant: Vestas Wind Systems A/S, Aarhus (DK)

(72) Inventor: Romaric Thiebaut, Aarhus (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 16/769,639

(22) PCT Filed: Dec. 7, 2018

(86) PCT No.: PCT/DK2018/050332
§ 371 (c)(1),
(2) Date: Jun. 4, 2020

(87) PCT Pub. No.: WO2019/110069
PCT Pub. Date: Jun. 13, 2019

(65) Prior Publication Data
US 2021/0164437 A1 Jun. 3, 2021

(30) Foreign Application Priority Data
Dec. 8, 2017 (GB) ..................... 1720521

(51) Int. Cl.
*F03D 1/06* (2006.01)
*F03D 80/50* (2016.01)
(Continued)

(52) U.S. Cl.
CPC ......... *F03D 1/0675* (2013.01); *F03D 1/0658* (2013.01); *B29D 99/0025* (2013.01);
(Continued)

(58) Field of Classification Search
CPC ........ F16B 11/006; F16B 19/02; F01D 1/065; F01D 1/0658; F01D 1/0675; F01D 80/50;
(Continued)

(56) References Cited

U.S. PATENT DOCUMENTS

| 4,420,354 A | 12/1983 | Gougeon et al. |
| 7,309,199 B2 * | 12/2007 | Ayrle ..................... C04B 28/24 |
| | | 411/258 |

(Continued)

FOREIGN PATENT DOCUMENTS

| CN | 102325646 A | 1/2012 |
| CN | 104822936 A | 8/2015 |

(Continued)

OTHER PUBLICATIONS

Intellectual Property Office, Search and Examination Report in GB1720521.2, dated Apr. 30, 2018.
(Continued)

*Primary Examiner* — Courtney D Heinle
*Assistant Examiner* — Sang K Kim
(74) *Attorney, Agent, or Firm* — Wood Herron & Evans LLP

(57) ABSTRACT

A replacement insert for the repair of a joint connecting a wind turbine blade to a rotor hub of a wind turbine is disclosed. The replacement insert includes a bushing having a first end, a second end, an outer surface, and an internal passageway. The replacement insert further includes a cover around at least a portion of the outer surface of the bushing. The replacement insert may have a non-circular cross-sectional profile. The cover defines an outer surface, and a plurality of protrusions extending from the outer surface of the cover. The protrusions are configured to operate as spacers when the replacement insert is positioned in a bushing cavity in the wind turbine blade to define a gap (Continued)

between the replacement insert and the walls of the bushing cavity.

26 Claims, 10 Drawing Sheets

(51) Int. Cl.
*B29D 99/00* (2010.01)
*B29L 31/08* (2006.01)

(52) U.S. Cl.
CPC ......... *B29L 2031/085* (2013.01); *F03D 80/50* (2016.05); *F05B 2280/6003* (2013.01); *F05B 2280/6013* (2013.01)

(58) Field of Classification Search
CPC ........... B29D 99/0025; B29L 2031/085; F05B 2260/301; F05B 2280/6003; F05B 2280/6013; F03D 1/065; F03D 1/0658; F03D 1/0675; F03D 80/50
USPC .......................................... 411/82, 82.2, 82.3
See application file for complete search history.

(56) References Cited

U.S. PATENT DOCUMENTS

| | | | |
|---|---|---|---|
| 10,605,296 B2 * | 3/2020 | Lor | F16B 19/14 |
| 10,975,838 B2 * | 4/2021 | Bech | F03D 1/0658 |
| 2007/0026960 A1 | 2/2007 | Butler et al. | |
| 2010/0084079 A1 | 4/2010 | Hayden et al. | |
| 2014/0030096 A1 * | 1/2014 | Dahl | B29C 70/86 416/217 |
| 2017/0022825 A1 | 1/2017 | Caruso et al. | |
| 2017/0022968 A1 * | 1/2017 | Caruso | B29C 70/86 |
| 2017/0045032 A1 * | 2/2017 | Jacobsen | F03D 1/0675 |
| 2020/0332762 A1 * | 10/2020 | Jalmer | B29C 70/86 |
| 2020/0392936 A1 * | 12/2020 | Smith | F03D 1/0658 |

FOREIGN PATENT DOCUMENTS

| | | |
|---|---|---|
| CN | 106609726 A | 5/2017 |
| EP | 0373642 A2 | 6/1990 |
| EP | 2781344 A1 | 9/2014 |
| EP | 3121440 A1 | 1/2017 |
| EP | 3121441 A1 | 1/2017 |
| ES | 2393865 A1 | 12/2012 |
| WO | 2012140039 A2 | 10/2012 |
| WO | 2012140062 A2 | 10/2012 |
| WO | 2015034708 A1 | 3/2015 |

OTHER PUBLICATIONS

European Patent Office, International Search Report and Written Opinion in PCT Application No. PCT/DK2018/050332, dated Feb. 25, 2019.

European Patent Office, Decision to Grant in EP Application No. 18821697.2, dated Oct. 14, 2022.

China National Intellectual Property Administration, First Office Action dated Nov. 3, 2022 in CN Application No. 201880088284.0, with English translation.

* cited by examiner

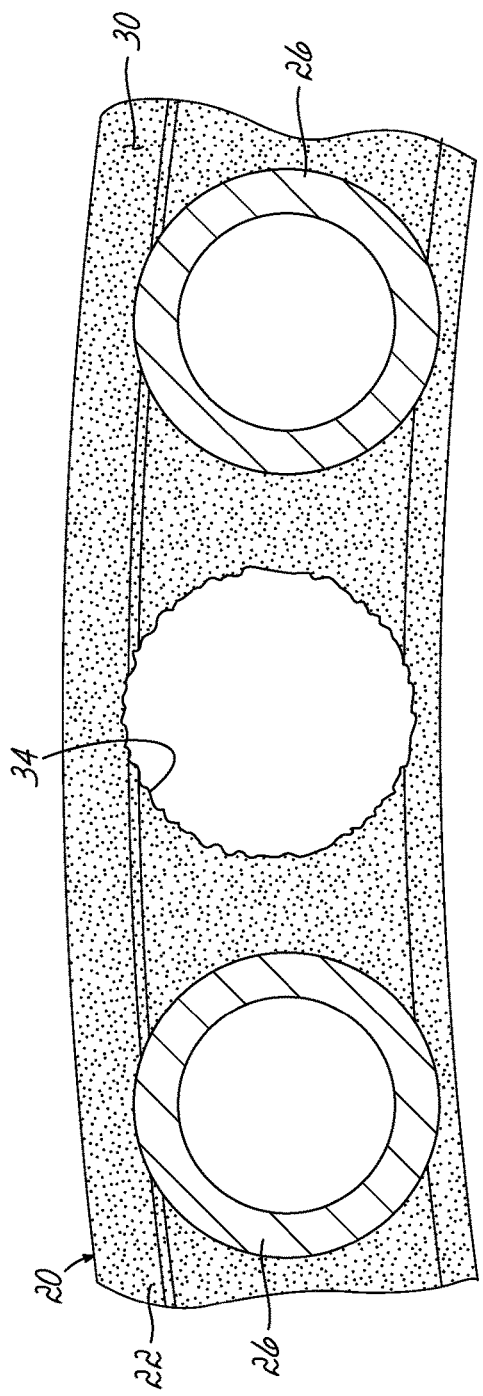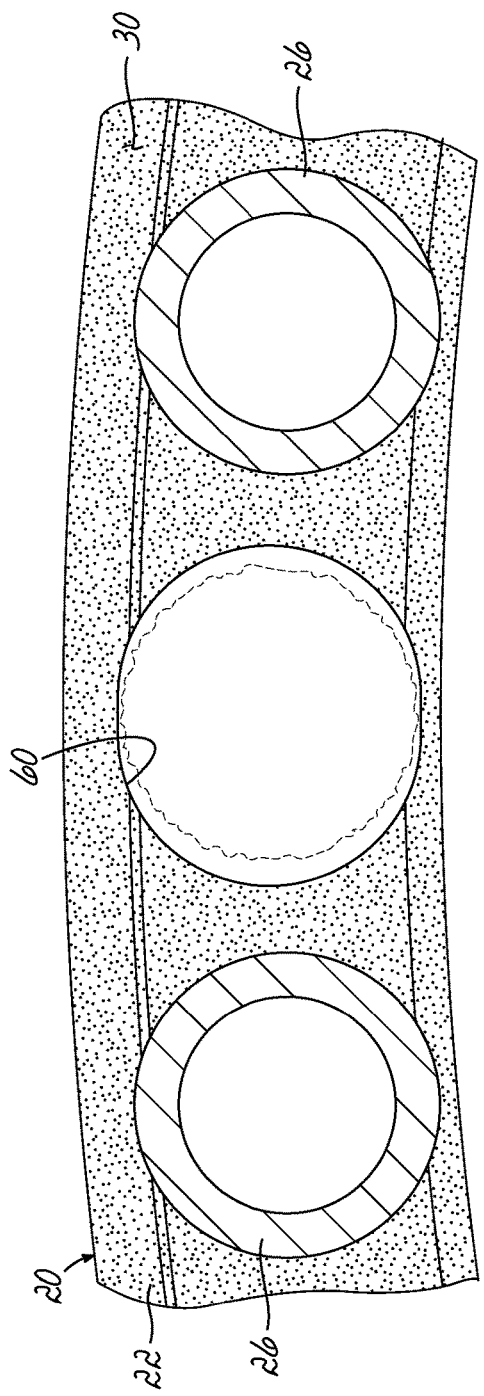

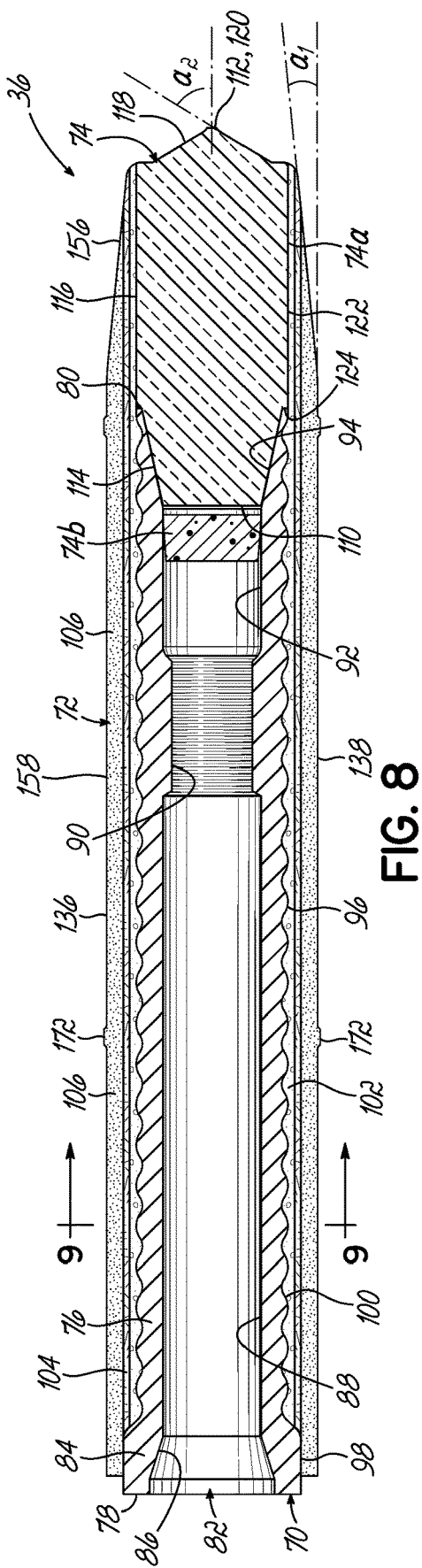
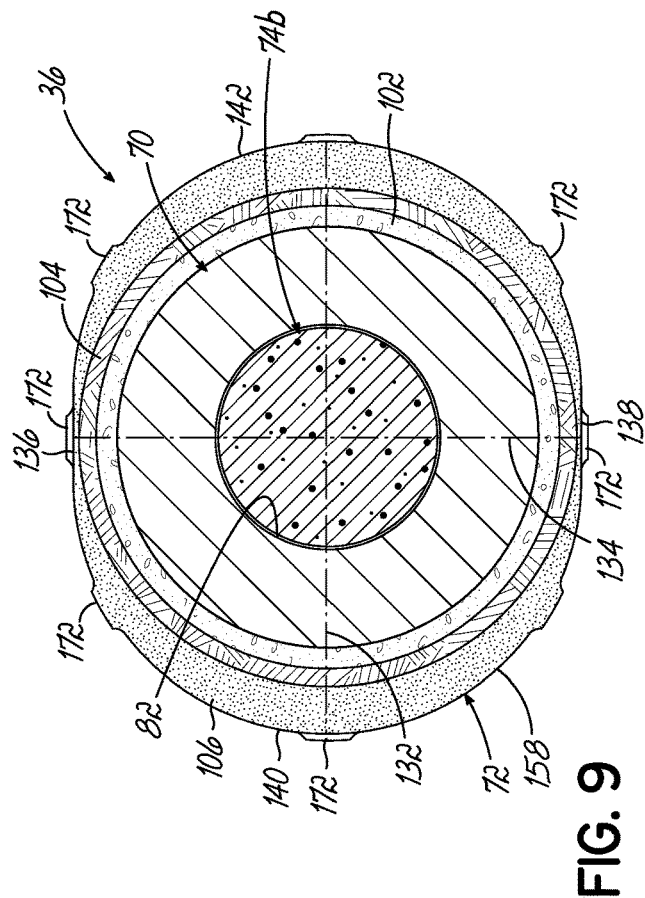
FIG. 8
FIG. 9

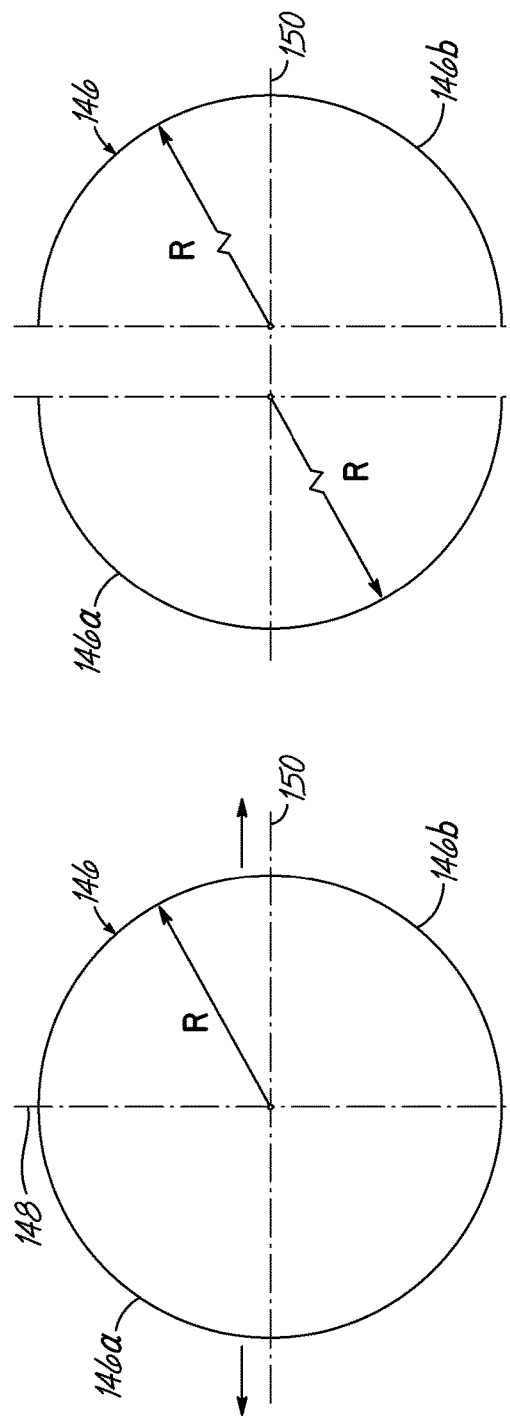
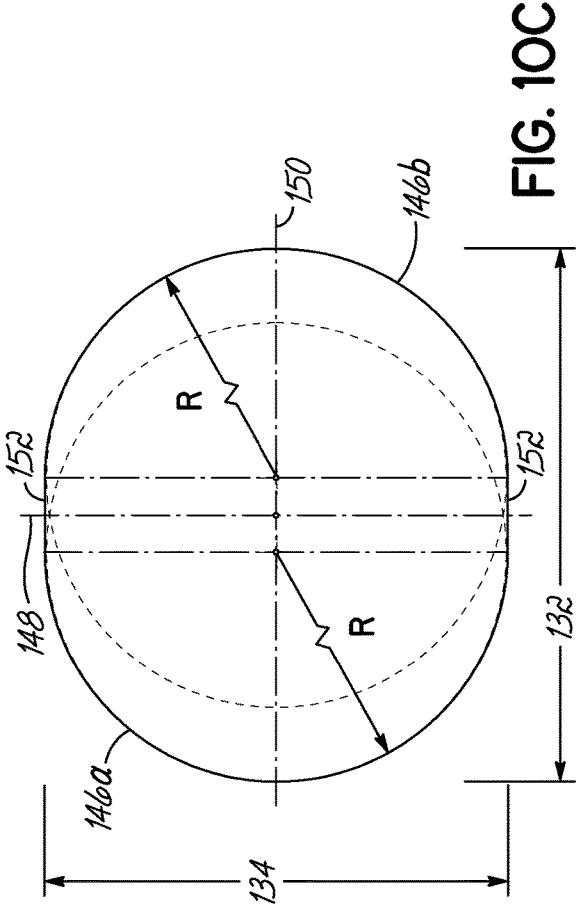
FIG. 10A
FIG. 10B
FIG. 10C

REPLACEMENT INSERT FOR REPAIR OF A JOINT CONNECTING A WIND TURBINE ROTOR BLADE TO A ROTOR HUB

TECHNICAL FIELD

The invention relates generally to wind turbines, and more particularly to a replacement insert for the repair of a joint connecting a wind turbine rotor blade to a rotor hub on a wind turbine.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a central hub and a plurality of blades coupled to the hub and extending outwardly therefrom. The rotor is supported on a shaft extending from the nacelle, which shaft is either directly or indirectly operatively coupled with a generator which is housed inside the nacelle. Consequently, as wind forces the blades to rotate, electrical energy is produced by the generator.

In recent years, wind power has become a more attractive alternative energy source and the number of wind turbine, wind farms, etc. has significantly increased, both on land and off-shore. Additionally, the size of wind turbines has also significantly increased, with modern wind turbine blades extending between 50 to 80 meters in length, and is expected to further increase in the future. The increased length in the wind turbine blades has introduced a number of interesting design considerations for wind turbine designers and manufacturers. For example, with increasing blade length, the joint between the wind turbine blade to the rotor hub may experience increased stresses that present challenging design considerations in order to ensure that the joint can withstand the loads expected during the operating life of the wind turbine.

Conventional joints between wind turbine rotor blades and the rotor hub include threaded stud bolts coupled to and extending from the root end of the wind turbine blade, which are in turn coupled to a pitch bearing associated with the rotor hub. Wind turbine blades are typically made from one or more composite materials formed from fibrous material and resin. Such materials generally do not have the structural integrity to provide a secure fixing mechanism into which the threaded stud bolts may be directly inserted. A hole or bore, for example, may be tapped into the composite material at the root end of the rotor blade to provide a complementing thread upon which the stud bolt may achieve a connection. However, the composite material has insufficient shear strength to transfer the loads between the blades and hub via the stud bolts and deterioration of the composite material at the interface would occur.

For this reason, manufacturers attempt to design a joint that more evenly distributes the forces occurring at the connection between the root end of the blade and the rotor hub. For example, in one design axial bores are formed along the circumference of the end face of the wind turbine blade. Internally threaded metal bushings are then positioned within the axial bores and adhesively bonded therein to essentially embed the metal bushings within the composite material of the rotor blade. Alternatively, the metal bushings may be positioned in the blade mould within the various shell laminates at the root end of the blade during the layup process of blade manufacture. The blade may then be infused with resin and cured to form the final blade, with the bushings being integrated into the root end of the blade as part of the original blade manufacture. In any event, the stud bolts are then threadably engaged with the metal bushings. The forces acting between the rotor blade and rotor hub act through the stud bolts, and thus are transferred via the metal bushings, which operate to more uniformly distribute the forces over the interface area with the softer composite material.

While current connection joints are generally sufficient to achieve their intended purpose of supporting the loads between the rotor blades and rotor hub, in some instances the adhesive bond or the blade material at a bushing/composite interface could become compromised leading to a loosening of the bushing within the composite blade material. This may occur over a blade's lifetime, perhaps due to incorrect operation or unusual stresses or unusual levels of fatigue or to a range of unpredictable factors. Should a sufficient number of bushings become compromised, then the joint between the blade and the rotor hub may not be able to easily sustain the loads and stresses that occur during operation of the wind turbine, and a risk of failure may arise. For example, a bushing whose adhesive or attachment is compromised though overload or such like, may tend to work itself loose over time. To avoid such a scenario, periodic inspections of the blade/rotor hub joint are recommended to ensure the integrity of the joint. Should a sufficient number of bushings be determined to be compromised during the inspection, then the entire wind turbine blade may need to be replaced before operation of the wind turbine may be resumed. Of course, such a replacement is very costly. This includes, not only the cost of an additional blade, but further includes costs associated with the large cranes and other equipment needed for a blade replacement, the labor required to achieve the replacement, and the lost operation time of the wind turbine during the replacement process.

Accordingly, there is a need in the wind turbine industry for a method of repairing a wind turbine blade, and more particularly repairing the metal bushings at the root end of the wind turbine blade in a more cost-effective manner so as to reestablish the strength and integrity of the joint between the blade and the rotor hub.

SUMMARY

To these and other ends, aspects of the invention are directed to a replacement insert for the repair of a joint connecting a wind turbine blade to a rotor hub of a wind turbine. The replacement insert includes a bushing having a first end, a second end, an outer surface, and an internal passageway. The replacement insert further includes a cover around at least a portion of the outer surface of the bushing. The replacement insert has a non-circular cross-sectional profile.

In another embodiment, a replacement insert includes a bushing have a first end, a second end, an outer surface, and an internal passageway, a cover around at least a portion of the outer surface of the bushing, the cover defining an outer surface, and a plurality of protrusions extending from the outer surface of the cover. The plurality of protrusions is configured to operate as spacers when the replacement insert is positioned in a bushing cavity in the wind turbine blade. The plurality of protrusions defines a gap between the outer surface of the replacement insert and the walls that define the bushing cavity.

In this embodiment, the plurality of protrusions may be formed from the same material as the cover. Additionally, the plurality of protrusions may be integrally formed with the cover, such as through a machining process of the outer surface of the insert. The plurality of protrusions may have substantially the same height. In this way, the gap between the outer surface of the insert and the walls of the bushing cavity may be configured to be substantially uniform. In one embodiment, the plurality of protrusions may be arranged into a plurality of rows, wherein each row is at a fixed position along a longitudinal axis of the bushing. Each row may also have a plurality of protrusions disposed about the outer surface of the cover. In one embodiment, the rows may be uniformly spaced apart from each other along the longitudinal axis of the bushing. Additionally, the protrusions in each row may be uniformly or non-uniformly spaced apart about the outer surface of the insert.

In one embodiment, the cover may be formed from a composite material. More particularly, the cover may be formed from a composite material that is substantially fully cured. In this way, the replacement inserts may be subject to post-processing techniques to provide size and dimension aspects as well as other desirable surface features. A cured cover also facilitates the handling, storage and transport of the replacement inserts.

In an exemplary embodiment, the replacement insert includes an oblong cross-sectional profile having a major axis and a minor axis, wherein the major axis is greater than the minor axis. By way of example, the cover may further include a first planar surface, a second planar surface opposed to the first planar surface, a first arcuate surface extending between the first and second planar surfaces, and a second arcuate surface extending between the first and second surfaces and opposed to the first arcuate surface. The first and second arcuate surfaces may have a substantially constant radius of curvature. The substantially constant radius of curvature may be substantially equal to the minor axis. In a further embodiment, the replacement insert may include a chamfer adjacent a tip of the replacement insert.

In an embodiment of the invention, the cover includes a plurality of layers of fibrous material. The fibers of adjacent layers may be oriented in different directions. For example, the fibers of each of the plurality of layers may be oriented in different directions. At least one of the plurality of layers of fibrous material may include a fiber roving, wherein the fibers of the roving are oriented in a direction substantially perpendicular to the longitudinal axis of the bushing. At least one of the plurality of layers of fibrous material may include a biaxial fiber sheet, wherein the fibers of the biaxial fiber sheet are oriented at +/− degrees relative to the longitudinal axis of the bushing. At least one of the plurality of layers of fibrous material includes a unidirectional fiber sheet, wherein the fibers of the unidirectional fiber sheet are oriented substantially parallel to the longitudinal axis of the bushing. In one exemplary embodiment, the plurality of layers of fibrous material includes an inner layer, the inner layer including a fiber roving wrapped around the outer surface of the bushing; an intermediate layer, the intermediate layer including a biaxial fiber sheet wrapped around the inner layer; and an outer layer, the outer layer including a unidirectional fiber sheet wrapped around the intermediate layer.

In yet another aspect, the replacement insert may include a plug positioned in the second end of the bushing and extending therefrom. The cover may be disposed around at least a portion of an outer surface of the plug. The replacement insert may further include a seal disposed in the internal passageway of the bushing. The seal is configured to prevent a contamination agent introduced into the passageway at the first end from reaching the second end of the bushing, thereby protecting the adhesive bond at the bushing/composite material interface.

In accordance with an aspect of the invention, the replacement insert is configured to initially be a separate, stand-alone element, which may be coupled to the wind turbine blade as part of a repair procedure.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 6A is a schematic end view of a wind turbine blade illustrating a bushing cavity after extraction of a bushing;

FIG. 6B is a schematic end view of a wind turbine blade illustrating a reconditioned bushing cavity;

FIG. 8 is a cross-sectional view of the replacement insert shown in FIG. 7;

FIG. 9 is another cross-sectional view of the replacement insert shown in FIG. 7;

FIGS. 10A-10C are conceptual schematic illustrations of the reshaping of the bushing cavity in accordance with an embodiment of the invention;

DETAILED DESCRIPTION

Figure 1:
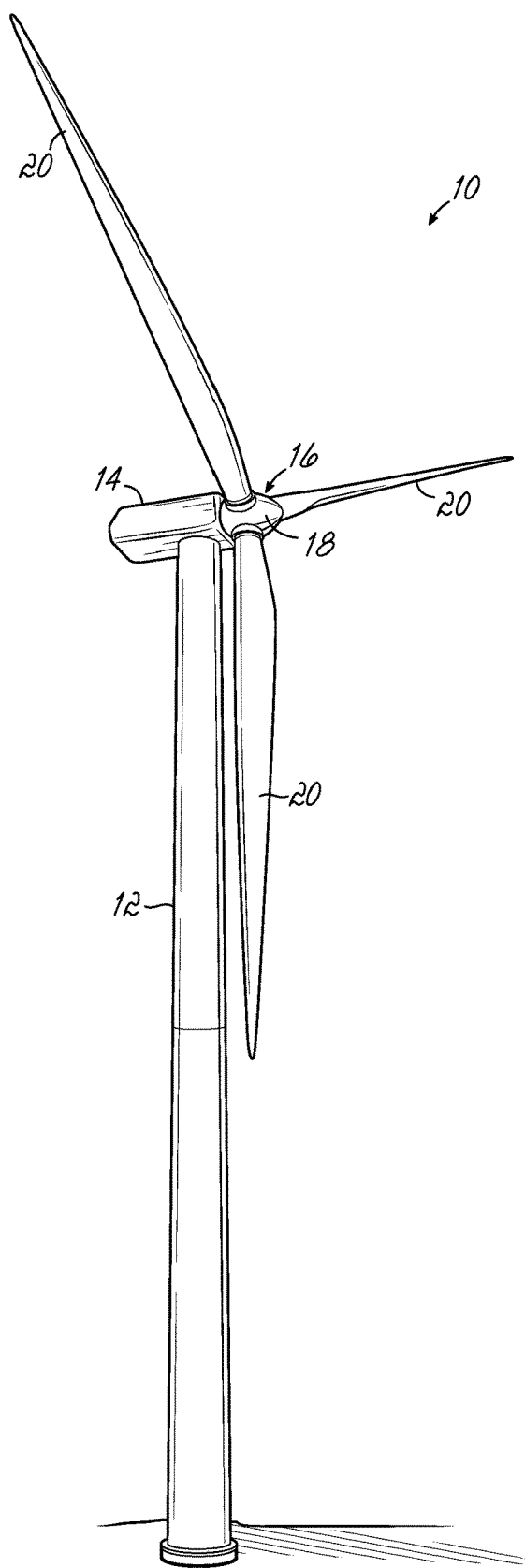
FIG. 1 is a perspective view of a wind turbine in which embodiments of the invention may be used.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of wind turbine 10 includes a central hub 18 and at least one rotor blade 20 that projects outwardly from the central hub 18 at locations circumferentially distributed thereabout. In the representative embodiment, the rotor 16 includes three blades 20, but the number may vary. The blades 20 are configured to interact with the passing air flow to produce lift that causes the central hub 18 to spin about a central longitudinal axis.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

As is well known in the industry, for certain wind turbine designs, the rotor blades 20 are coupled to the rotor hub 18 in a manner that allows the blades 20 to rotate or pitch about a longitudinal axis of the blades 20. This is achieved by coupling the root end 22 of a blade 20 to a pitch bearing (not shown) operatively coupled to the rotor hub 18. The pitch bearing generally includes a ring rotatable relative to the hub 18 to which the root end 22 of the blade 20 is coupled. Pitch bearings are generally well known in the art and thus will not be described in further detail herein.

Figure 2:
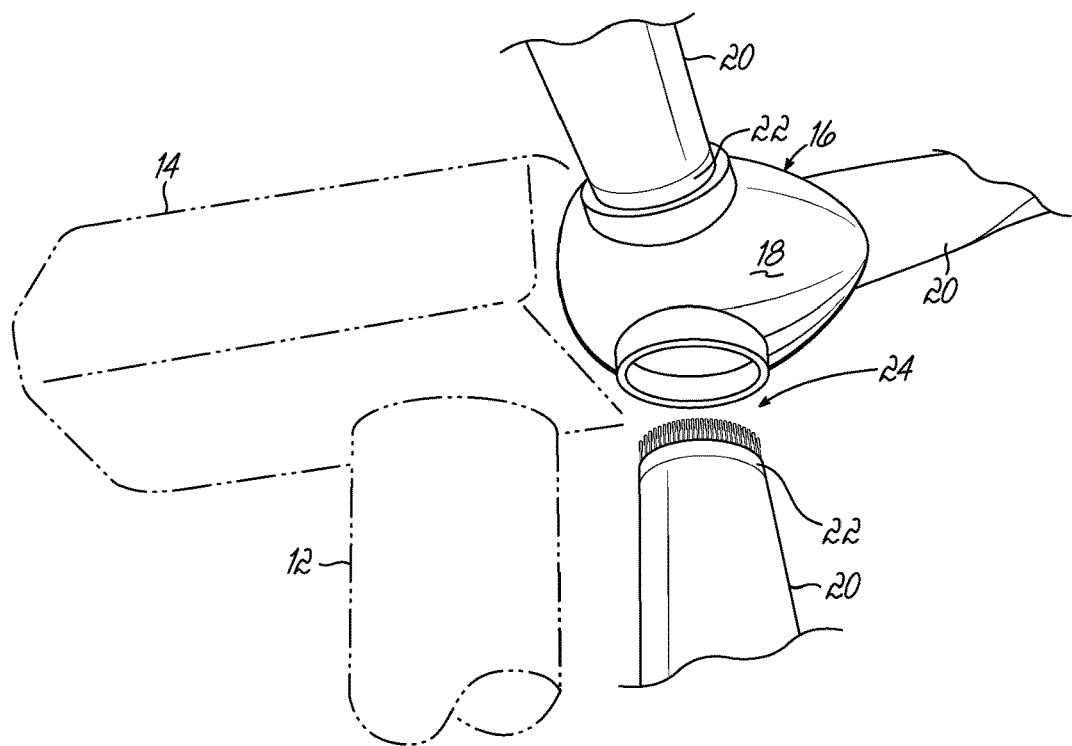
FIG. 2 is a partial perspective view of a root end of a wind turbine blade.
Figure 3:
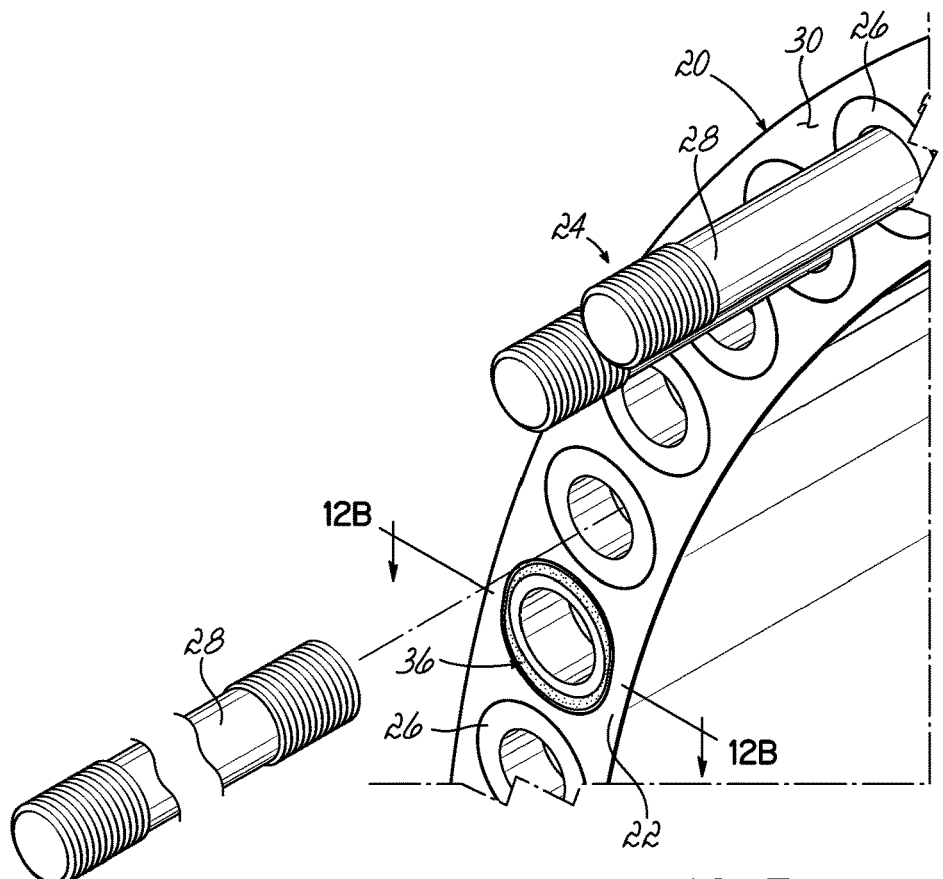
FIG. 3 is a partial view of the root end of the wind turbine blade shown in FIG. 2.

As illustrated in FIGS. 2 and 3, a connection joint 24 between a rotor blade 20 of the wind turbine 10 and the rotor hub 18 includes a plurality of bushings 26 coupled to the rotor blade 20 at the root end 22 thereof, and a plurality of stud bolts 28 configured to be coupled to the bushings 26 in the rotor blade 20 (FIG. 3) and further configured to be coupled to the rotor hub 18 (FIG. 2), such as through the pitch bearing. As illustrated in FIG. 3, the bushings 26 may be circumferentially spaced about an end face 30 at the root end 22 of the blade 20 and embedded within the composite material of the blade 20. The number of bushings 26 along the circumference of the root end 22 of the blade 20 depends on the size of the blade, among potential other factors, but may be anywhere from 70 to 180 inserts for blades between 50 m-80 m in length. It should be realized, however, that more or less inserts may be used depending on the specific application.

Figure 4:
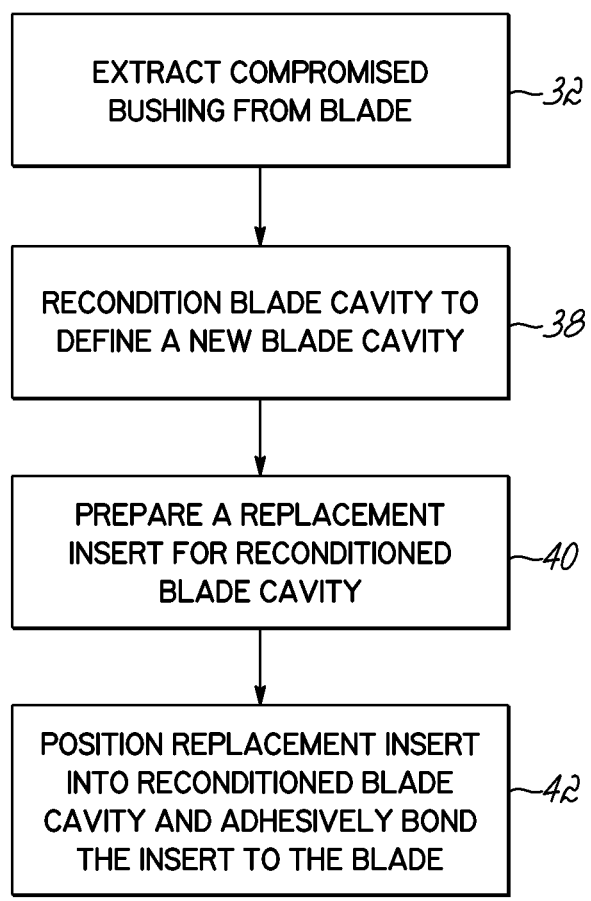
FIG. 4 is a flow chart of an exemplary repair process of a bushing of a wind turbine blade.

As noted above, in some instances, one or more bushings 26 may become compromised such that the bond strength at the bushing/composite material interface may be significantly reduced. In this case, the bushings 26 may be described as being generally loose within the composite blade material that surrounds the bushing 26. Aspects of the present invention are directed to repairing a loose or otherwise compromised bushing 26 at the root end 22 of the wind turbine blade 20. In this regard, FIG. 4 broadly illustrates steps of a bushing repair process in accordance with aspects of the invention. To this end, the process includes extracting a compromised bushing 26 from the root end 22 of the blade 20, as illustrated by step 32. Next, the bushing cavity 34 which results from the extraction of the bushing 26 may be reconditioned in order to receive a replacement insert 36 which includes a new bushing. This is illustrated as step 38 in FIG. 4. A replacement insert 36 may be prepared for positioning within the reconditioned bushing cavity 34, as represented by step 40. As will be explained in more detail below, in one advantageous aspect the replacement insert 36 may be formed in a process that is separate from the repair process such that one or more replacement inserts 36 are readily available during the repair process. Lastly, the replacement insert 36 may be positioned in the reconditioned bushing cavity and adhesively bonded to the root end 22 of the blade 20. This is illustrated as step 42 in FIG. 4.

In one embodiment, the repair process described above may occur at a manufacturing, repair, or other facility having the requisite machinery to effectuate the repair. Accordingly, the repair process may further include removing the impacted blade 20 from the wind turbine 10; transporting the blade 20 to the manufacturing/repair facility; repairing one or more compromised bushings 26 as described above and described in more detail before; transporting the repaired blade 20 back to the wind turbine site; and reattaching the repaired blade 20 to the wind turbine 10. As the details of removing/attaching a wind turbine blade 20 to the wind turbine 10 and transporting a blade between a facility and wind turbine site is generally well known, these aspects will not be described in further detail herein. In an alternative embodiment, the repair process may be implemented at the wind turbine site, thus forgoing the transport of the wind turbine blade 20 back and forth from a manufacturing/repair facility.

Figure 5:
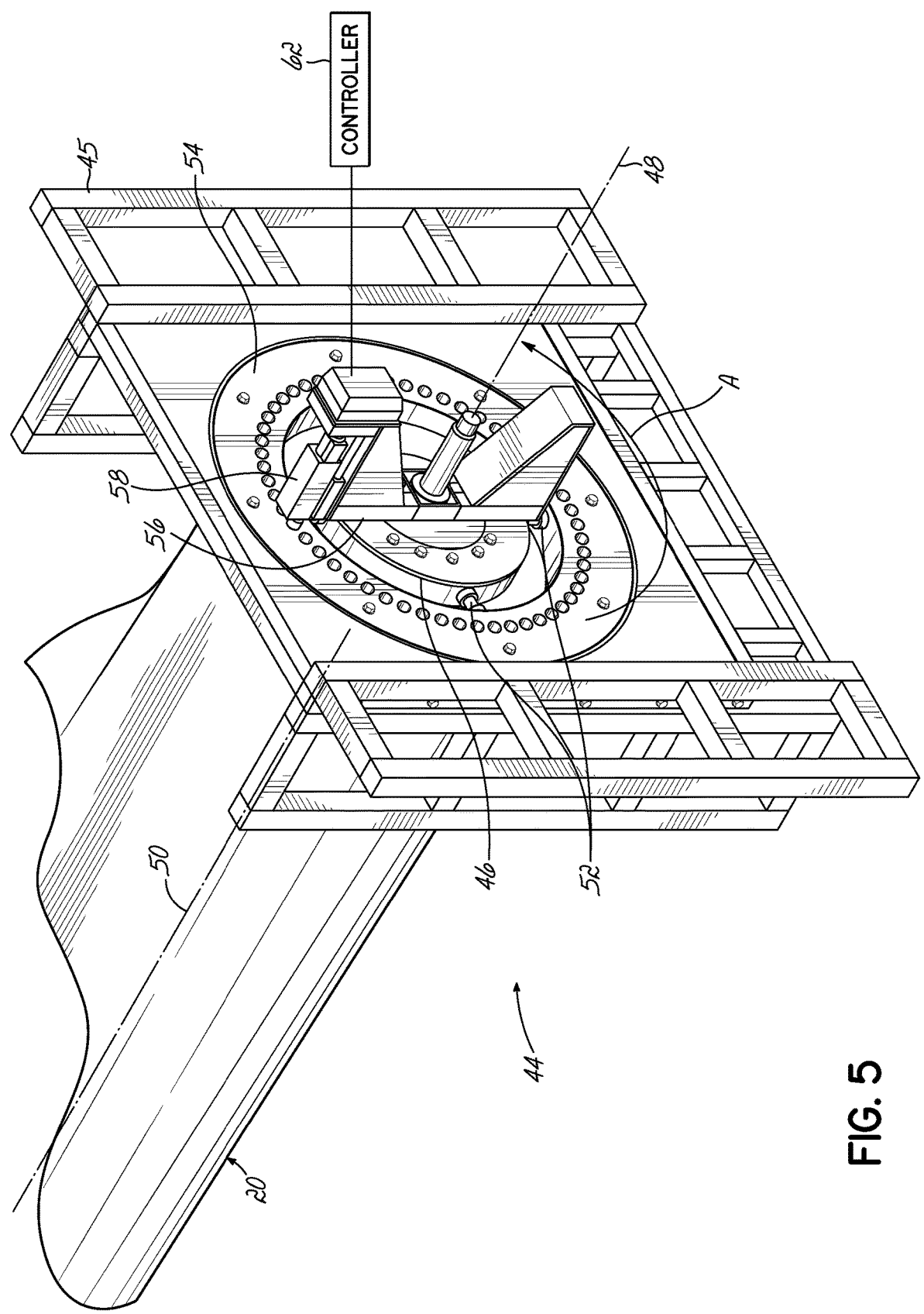
FIG. 5 is a perspective view of a jig used to extract a bushing from the wind turbine blade and to recondition the blade cavity that results from the extraction.

In an exemplary embodiment and as illustrated in FIG. 5, the extraction of an existing bushing 26 may be achieved using a jig 44 configured to be operatively coupled to the root end 22 of the blade 20. In one embodiment, the jig 44 may include a support frame 45 configured to be in engagement with the end face 30 of the blade 20. The jig 44 includes a central hub or chuck 46 that defines a central axis 48. The jig 44 is coupled to the root end 22 of the blade 20 in an adjustable manner such that the central axis 48 of the chuck 46 may be substantially coaxially aligned with the center axis 50 of the blade 20 at its root end 22. By way of example and without limitation, the central chuck 46 may include a plurality of extendable pins 52 which may engage with an inner surface of the blade 20 at the root end 22 or with a template 54 disposed over the end face 30 of the blade 20. The extendable pins 50 may be adjusted accordingly such that the axes 48, 50 are substantially coaxially aligned.

The jig 44 further includes an arm 56 rotatably coupled to the central chuck 46 and rotatable about the central axis 48. The arm 56 extends radially outward from the central axis 48 to a tool head 58 configured to be carried adjacent a terminating end of the arm 56. The length of the arm 56 may be adjustable such that the tool head 58 may be positioned immediately above a bushing 26 that is to be extracted. Various tool heads 58 may be selectively operatively coupled to the arm 56 depending on the particular task being performed. By way of example and without limitation, to effectuate the extraction of a bushing 26, the tool head 58 may include an extraction tool that essentially pulls the bushing 26 out of the root end 22 of the blade 20. In one exemplary embodiment, the extraction tool may include a hydraulic jack or actuator. In this case, a rod or stud 28 bolt may be threadably engaged with a selected bushing 26 and operatively coupled to the hydraulic actuator. The hydraulic actuator may then be activated so as to apply enough force (e.g., up to 10 tons, for example) to the selected bushing 26 to break any remaining adhesive bonds between the selected bushing 26 and the composite blade material, and thereby pull the bushing 26 from the blade 20.

The use of a hydraulic actuator as the extraction tool is merely exemplary, and the extraction tool may take other forms sufficient to pull the selected bushing 26 from the root end 22 of the blade 20. For example, if the selected bushing 26 cannot be readily pulled from the blade 20 in a first instance, then part of the bushing 26 may have to be drilled out (such as with a core bit), and then any remaining portion of the bushing 26 may be pulled from blade 20. In this instance, the extraction tool may include or further include a drill bit for achieving removal of at least a portion of the bushing 26. It should be recognized that if there is more than one compromised bushing 26 that needs to be extracted from the blade 20, then the arm 56 may be rotated about the central axis 48 of the chuck 46 (as illustrated by arrow A) so as to be above and generally aligned with another compromised bushing 26. The steps described above may then be repeated so as to extract the selected bushing 26 from the blade 20.

As discussed above and illustrated in FIG. 6A, upon removal of a bushing 26 from the blade 20, a bushing cavity 34 remains in the blade 20. While some of the compromised or otherwise damaged composite blade material may be pulled away upon extraction of the compromised bushing 26, some of the composite blade material that is left behind and thereby forms the bushing cavity 34, may be damaged and thus unable to form a strong adhesive bond with a new bushing of element positioned back in the bushing cavity. Accordingly, in a preferred embodiment, some of the composite blade material around the bushing cavity 34 may be excised or removed so as to expose uncompromised or undamaged composite blade material to the new element replacing the original bushing 26. Accordingly, the bushing cavity 34 may be reconditioned by removing a relatively small amount of material along at least a portion of the bushing cavity 34 to define a new and oversized (relative to blade cavity 34) reconditioned bushing cavity 60 which is configured to receive a replacement insert 36 therein. For example, and without limitation, between about 70%-95% of the area of the bushing cavity 34 may have material removed to define the new bushing cavity 60. The reconditioned bushing cavity 60 is configured to expose new and undamaged composite blade material, and thereby form a more secure bond between the composite blade material and the replacement insert 36, as will be explained in more detail below. The particular shape and dimensions of the reconditioned bushing cavity 60 may be generally dictated by the shape and dimensions of the replacement insert 36. More particularly, the shape and dimensions of the bushing cavity 60 may be substantially similar to the shape and dimensions of the replacement insert 36. By way of example, the reconditioned bushing cavity 60 may be just slightly oversized relative to the replacement insert 36 so as to define a substantially constant gap (e.g., about 0.5 mm) between the outer surface of the replacement insert 36 and the inner wall of the bushing cavity 60, as will be explained in more detail below.

In accordance with one embodiment, the jig 44 may be used to form the reconditioned bushing cavity 60. In this regard, the tool head 58 may be configured as a reshaping tool, such as a mill bit, drill bit or other suitable boring or reaming tool for removing material from about the bushing cavity 34. In this regard, once the shape and dimensions of the reconditioned bushing cavity 60 are determined (e.g., such as by the shape and dimensions of the replacement insert 36), the jig 44 may be used to reshape the bushing cavity 34. To this end, the jig 44 may include a controller 62 operatively coupled to the tool head 58 so as to control the position and operation of the tool head 58, and thereby engage with the composite material so as to arrive at the desired shape and dimensions for the reconditioned bushing cavity 60. An exemplary reconditioned bushing cavity 60 is illustrated in FIG. 6B.

Figure 7:
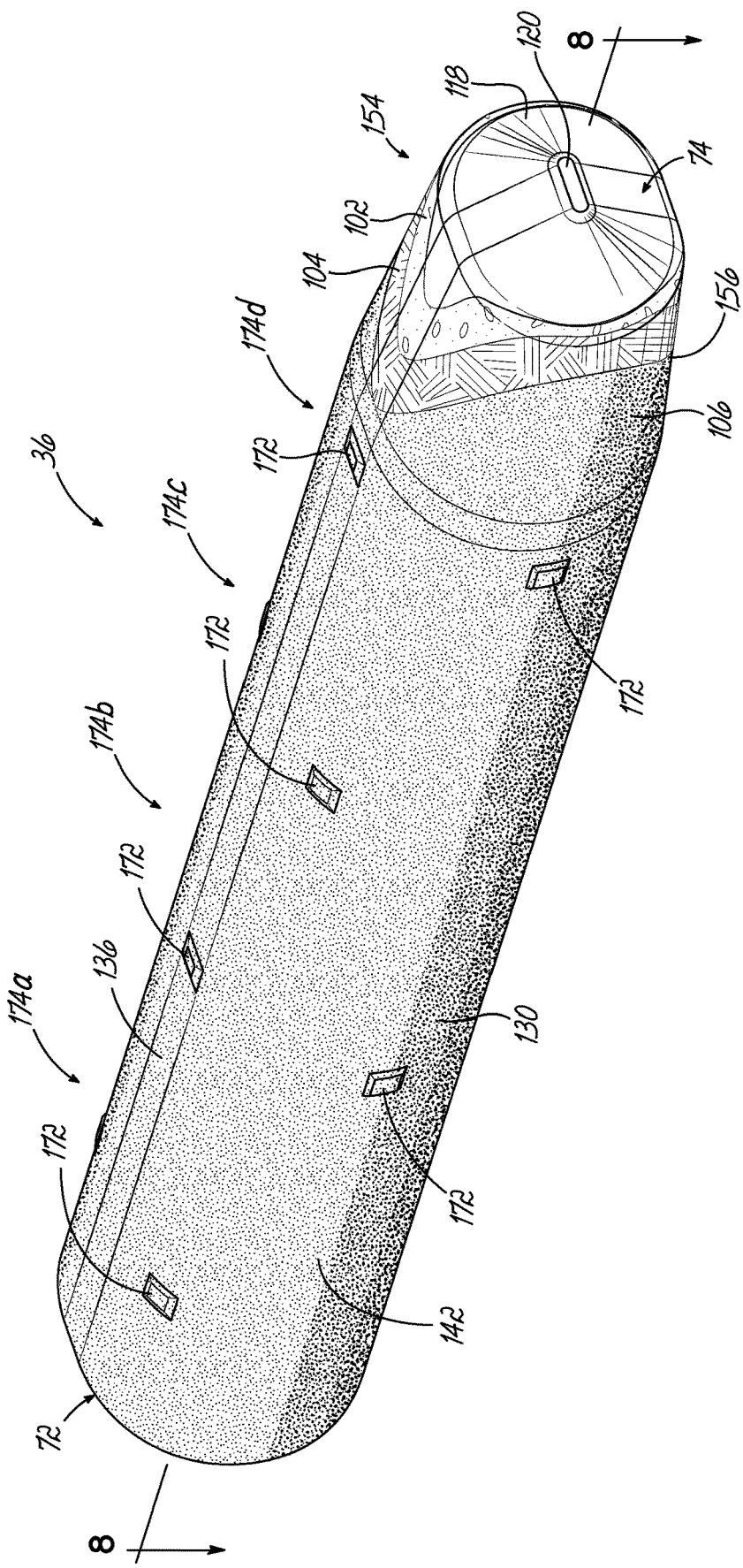
FIG. 7 is a perspective view of a replacement insert in accordance with an embodiment of the invention.

FIGS. 7-9 illustrate a replacement insert 36 in accordance with an exemplary embodiment of the invention. In one aspect of the invention, the original bushing 26 is replaced by an insert 36, which includes not only a new bushing 70, but also an outer wrapping or cover 72 of composite material and one or more plugs 74. In one particular aspect of the invention, the replacement insert 36 is a stand-alone element that is formed in a separate process from the repair process described above in reference to FIG. 4. More particularly, the composite material cover 72 is substantially fully cured prior to the insert 36 being positioned in the reconditioned bushing cavity 60 in the root end 22 of the blade 20. This may provide a number of advantages. One advantage, for example, is that when the replacement insert 36 is adhesively bonded in the reconditioned bushing cavity 60, that bond takes place at an interface between two cured composite materials. This provides for a strong bond of the replacement insert 36 (and the new bushing 70) with the composite blade material that forms the walls of the reconditioned bushing cavity 60. Second, forming the replacement insert 36 separately from the repair process allows manufacturers to take more time and care in ensuring that the adhesive bond at the metal/composite interface between the new bushing 70 and the cover 72, which can sometimes be problematic, is of high quality. In other words, the formation of the potentially more problematic bonding interface is performed on a smaller, more controllable scale, and therefore results in generally higher quality adhesive bonds at the metal/composite interface. Third, since the composite material cover 72 of the replacement insert 36 is cured, the outer surface of the cover 72 may be subject to various machining processes in order to provide a desired shape or dimension, and to provide additional features (such as spacers, described below) to the replacement insert 36 that are useful in the repair process. The replacement inserts 36 may also be more easily handled during use, storage, and transport.

The bushing 70 may be similar to the bushing 36, and may include a generally cylindrical elongate body 76 having a first end 78, an opposing second end 80, and a passageway 82 extending between the first and second ends 78, 80. The elongate body 76 may be made of a suitable metal, such as steel, having sufficient strength for accommodating the expected loads during operation. The first end 78 may include a flange 84 and is configured to be positioned adjacent to the end face 30 of the blade 20 such that a stud bolt 28 may access the passageway 82. The second end 80 is configured to be positioned away from the end face 30 and embedded within the blade material. The passageway 82 includes a first tapered portion 86 (e.g., diverging in a direction toward the first end 78) adjacent the first end 78, a first generally straight portion 88, a threaded portion 90, a second generally straight portion 92, and a second tapered portion 94. The first tapered portion 86 may be configured to guide the insertion of stud bolts 28 into the bushing 70, the threaded portion 90 may be configured to engage with the threads of the stud bolts 28, and the second tapered portion 94 (e.g., diverging in a direction toward the second end 80) may be configured to engage with a plug, such as plug 74a. The arrangement of passageway 82 described above is exemplary and other arrangements may also be possible, and aspects of the invention should not be limited to that shown in the figures.

The outer surface 96 of the bushing 70 may have a smooth portion 98 along the flange 84 and an undulating portion 100 (e.g., a series of crests and troughs) along a remaining portion of the bushing 70. The undulating profile is configured to increase the surface area and provide an improved interface with the composite material of the cover 72. In an exemplary embodiment, the diameter of the flange 84 may be greater than the diameter of the bushing 70 along the undulating portion 100. By way of example, the undulating portion 100 may have a diameter that is reduced between about 10% and about 20% of the diameter of the flange 84. In an exemplary embodiment, for example, the length of the bushing 70 may be between about 30 cm and about 40 cm, and preferably about 36 cm, the outer diameter along the flange 84 may be between about 5 cm and about 6 cm, and preferably about 5.8 cm, and the outer diameter along the undulating portion 100 may be between about 4.5 cm and about 5.5 cm, and preferably about 5 cm. Of course, the bushing 70 may have other dimensions and remain within the scope of the present invention.

The outer cover 72 of composite material may include a plurality of layers of composite material disposed about the outer surface 96 of the bushing 70. For example, the outer cover 72 may include three layers of composite material, more or fewer layers may be possible, however. In this regard and in an exemplary embodiment, the cover 72 may include a first inner layer 102, an intermediate layer 104, and an outer layer 106 of composite material. The configurations of the fibers in the composite material may be different for each of the layers 102, 104, 106 of the outer cover 72. By way of example and without limitation, the inner layer 102 may have fibers (e.g., carbon or glass fibers) extending in the transverse or perpendicular direction (e.g., 90 degrees) relative to the longitudinal axis of the bushing 70. The intermediate layer 104 may have fibers extending in a crisscross fashion at an angle relative to the longitudinal axis of the bushing 70. For example, the fibers of the intermediate layer 104 may extend at +/−45 degrees relative to the longitudinal axis. Lastly, the fibers of the outer layer 106 may be unidirectional fibers extending substantially parallel (e.g., 0 degrees) to the longitudinal axis of the bushing 70. In general, the orientation of the fibers in the outer layer 106 should generally correspond to the orientation of the fibers in the composite material that forms the walls of the reconditioned bushing cavity 60. However, aspects of the invention are not limited to this particular arrangement of the fibers in the composite material that forms the layers 102, 104, 106 of the cover 72, and those of ordinary skill in the art should recognize that other fiber arrangements may be possible.

As illustrated in the figures, the replacement insert 36 includes a first plug 74a coupled to the second end 80 of the bushing 70 and extending therefrom. The first plug 74a includes a generally cylindrical body 108 having a first end 110 and a second end 112. In one embodiment, the first plug 74a may be generally solid. Alternatively, however, the first plug 74a may be hollow. In a preferred embodiment, the first plug 74a may be formed of a fibrous material, such as wood, for example. However, other materials for the first plug 74a may also be possible. The first plug 74a may include a first tapered portion 114 adjacent the first end 110 and converging in a direction toward the first end 110, a generally straight portion 116, and a second tapered portion 118 adjacent the second end 112 and converging in a direction toward the second end 112. The second end 112 of the plug 74a terminates in a raised ridge 120. The outer surface 122 of the plug 74a may be generally smooth in an exemplary embodiment.

The first tapered portion 114 of the plug 74a is sized and dimensioned so as to be received in the second tapered portion 94 of the passageway 82 of the bushing 70. More particularly, the taper angle of the first tapered portion 114 of the plug 74a may be substantially the same as the taper angle of the second tapered portion 94 of the bushing 70 such that the plug 74a is seated therein. To this end, the plug 74a may include a shoulder 124 that engages with an end face of the bushing 70 at the second end 80. The straight portion 116 and the second tapered portion 118 extend beyond the second end of the bushing 70. In an exemplary embodiment, the length of the first plug 74a may be between about 10 cm and about 15 cm, and preferably about 12 cm. Additionally, the diameter of the plug 74a along the straight portion 116 may be about the same as the outer diameter of the undulating portion 100 of the bushing 70, e.g., between about 4.5 cm and about 5.5 cm, and preferably about 5 cm. As demonstrated in the figures, one or more of the layers 102, 104, 106 of the cover 72 may surround most of the plug 74a that extends beyond the second end 80 of the bushing 70. For example, in one embodiment only the second tapered portion 118 may not be encased within the cover 72. Additionally, in one embodiment each of the three layers 102, 104, 106 are disposed about the plug 74a.

In addition to the first plug 74a, the replacement insert 36 may include a sealing plug 74b disposed adjacent the second end 80 of the bushing 70. More particularly, the sealing plug 74b may be formed from a suitable material that forms a seal with the inner wall of the passageway 82. For example, the sealing plug 74b may be formed from a synthetic rubber, such as a fluoro rubber (fluoroelastomers). Other materials may also be possible. In one embodiment, the sealing plug 74b may be positioned in the second straight portion 92 to seal the passageway 82. In this way, any hydraulic oil or other contaminating elements that enter the passageway 82 of the bushing 70 are not able to penetrate into the metal/composite interface or the wood/composite interface associated with the replacement insert 36. This is intended to resolve what is believed to be a primary cause of the contamination of the bushings and surrounding composite material at least along a path from the interior of the insert 36.

In one aspect of the invention, the outer profile 130 of the replacement insert 36 is configured to improve the adhesive bond between the replacement insert 36 and the reconditioned bushing cavity 60. In this regard, the concept is to provide the replacement insert 36 with a non-circular cross-sectional profile. In an exemplary embodiment, for example, the replacement insert 36 may have an elliptical or oblong cross-sectional profile, which may be generally characterized by a major axis 132 and a minor axis 134, wherein the major axis 132 is greater than the minor axis 134. The change from a generally circular cross-sectional profile (e.g., from the cross-sectional profile of the original bushing 34) to an elliptical or oblong cross-sectional profile of the replacement insert 36 is intended to increase the contact surface area between the insert 36 and the composite blade material of the reconditioned bushing cavity 60, and to provide an interface of increased uncontaminated composite blade material.

FIG. 9 illustrates an exemplary cross-section of the replacement insert 36 having a major axis 132 and a minor axis 134, wherein the major axis is greater than the minor axis 134 to provide an oblong cross-sectional profile. By way of example, the major axis 132 may be between about 10% and about 25% greater than the minor axis 134. More particularly, in the exemplary embodiment illustrated in FIG. 8, the outer profile 130 includes a first generally planar surface 136, a second generally planar surface 138 opposed to the first planar surface 136, a first generally arcuate side surface 140 extending between the first and second planar surfaces 136, 138, and a second generally arcuate side surface 142 also extending between the first and second planar surfaces 136,138 and being opposed to the first arcuate surface 140. In one embodiment, the first and second arcuate surfaces 140, 142 may be formed as portions of a circle, i.e., they have a generally constant radius of curvature. The circular portions may be semicircular such that the center of the circular portions lie on a line that connects the edges of the planar surfaces 138, 140.

The particular cross-sectional profile described above may be a consequence of starting with a generally circular cross-sectional profile (e.g., from the original cylindrical bushing 34) with the desire to produce an oblong cross-sectional profile (to improve adhesive bonding at the new interface) but without expanding the bushing cavity in the radial direction, and all with attention to the ability to produce such an outer profile 130 on the replacement insert 36 and the ability to produce a reconditioned bushing cavity 60 having a similar profile. In one embodiment, and as schematically illustrated in FIGS. 10A-10C, these may be conceptually achieved by separating a circular profile 146 have a generally constant radius of curvature R at its centerline 148, moving the two semicircular profiles 146a, 146b apart along a linear axis 150 perpendicular to the centerline 148, and filling the gap with planar surfaces 152. Such a cross-sectional profile is believed relatively straight forward to form (in the blade 20) starting from a circular cross-sectional profile, ending with an oblong cross-sectional profile, and using conventional machining tools, such as drill bits, mill bits, reaming tools, etc.

A tip 154 of the replacement insert 36 may also have a particular configuration. More particularly, the tip 154 of the replacement insert 36 may have a taper or chamfer 156 wherein the cross-sectional area decreases in a direction toward the raised ridge 120. The degree to which the outer profile 130 converges inwardly may be characterized by a taper angle $a_1$. In an exemplary embodiment, the taper angle $a_1$ may be between about 2 degrees and about 10 degrees, and preferably between about 4 degrees and 7 degrees. The oblong profile of the upper portion of the replacement insert 36 may be maintained in the tapered tip 154. For example, the major/minor axis ratio may be maintained in the tapered tip 154 to produce a uniform taper in the tip 154. Other configurations of the tip are possible however. The taper 156 occurs primarily in the outer layer 106 of the cover 72, but may extend into the intermediate and inner layers 104, 102 as illustrated in FIG. 7, for example. As described above, the second tapered portion 118 of the plug 74a may be exposed and not surrounded by the cover 72 (FIG. 7). The taper angle $a_2$ in this region of the plug 74a may be between about 50 degrees and about 70 degrees, and preferably between about 58 degrees and 62 degrees. The tapered configuration in the tip 154 of the replacement insert 36 may be configured to improve the flow of adhesive and air removal during the insertion and bonding of the replacement insert 36 in the reconditioned bushing cavity 60, as will be explained in more detail below.

Figure 11:
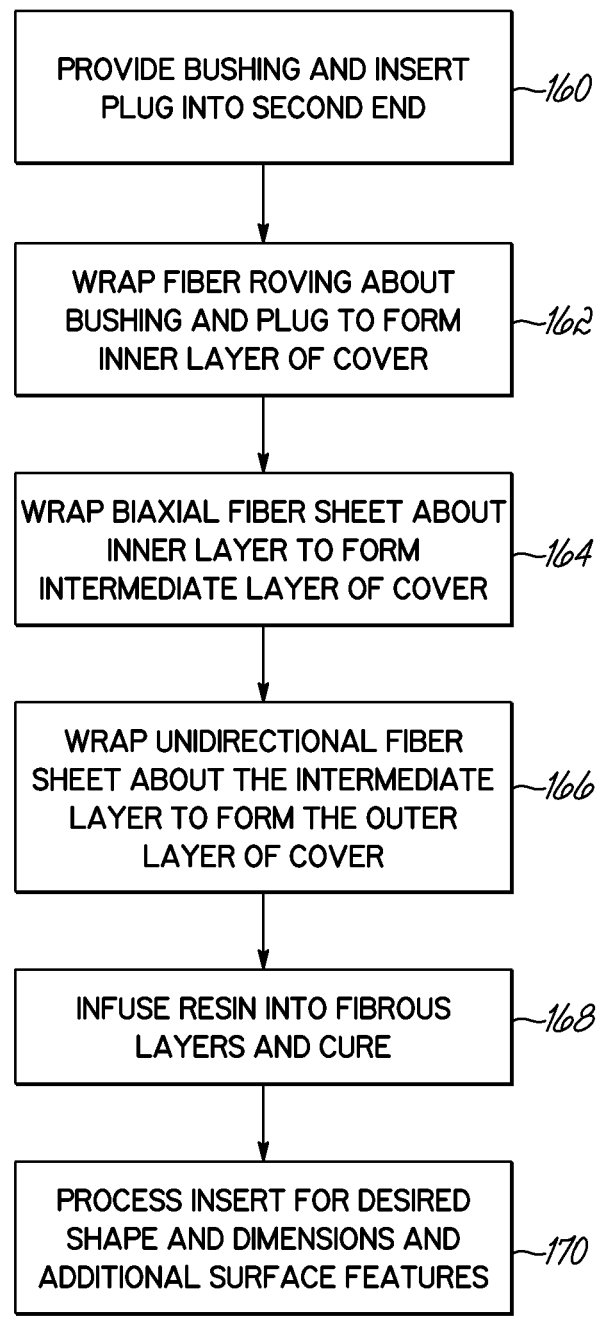
FIG. 11 is a flow chart of an exemplary method of making the replacement insert illustrated in FIG. 7.

An exemplary method of making replacement insert 36 will now be described in reference to FIG. 11. With a metal bushing 70 provided, a plug 74a may be coupled to the second end 80 thereof by inserting the first tapered portion 114 of the plug 76a into the second tapered portion 94 of the passageway 82 at the second end 80 of the bushing 70. This is illustrated in step 160. In a next step 162, a glass or carbon spun fiber roving may be wrapped about the outer surface 96 of the bushing 70 along the undulating portion 100 and along the straight portion 116 of the plug 76a. Preferably, the roving is wrapped about the bushing 36 and plug 76a in a direction transverse to the longitudinal axis of the bushing 36. In one embodiment, this roving does not overlie the flange 84, but starts just down from the flange 84 in the reduced diameter region. This roving constitutes the inner layer 102 of the cover 72 and may have a thickness such that the outer diameter of the inner layer 102 is between about 5% and 10% greater than the outer diameter of the bushing along the undulating portion 100. For example, the thickness of the inner layer 102 may be about 2 mm in an exemplary embodiment. Other thicknesses are also possible.

In step 164, one or more glass biaxial fabric sheets may be wrapped about the inner layer 102 and constitute the intermediate layer 104. Preferably, and as noted above, the fiber of the biaxial fabric sheets may be oriented at +/−45 degrees relative to the longitudinal axis of the bushing 60. In one embodiment, the biaxial fabric sheets also do not overlie the flange 84, but start just down from the flange 84. In one embodiment, the thickness of the intermediate layer 104 is such that the outer diameter of the intermediate layer 104 may be substantially the same as the outer diameter of the flange 84. More broadly perhaps, the thickness of the intermediate layer 104 may be such that the outer diameter of the intermediate layer 104 may be between about 5% and about 10% greater than the outer diameter of the inner layer 102. For example, the thickness of the intermediate layer may be about 2 mm in an exemplary embodiment. Other thicknesses are also possible, however.

In a further step 166, one or more glass unidirectional fiber sheets may be wrapped about the intermediate layer 104 and constitute the outer layer 106 of the cover 72. Preferably, the fibers of the unidirectional fabric sheets may be oriented at 0 degrees so as to be generally parallel to the longitudinal axis of the bushing 70. In one embodiment, the unidirectional fabric sheets do overlie or surround the flange 84 so that an edge of the sheets are generally flush with an end face of the bushing 70 at the first end 78. The thickness of the outer layer 106 may be such that the outer diameter of the outer layer 106 is between about 20% and about 30% greater than the outer diameter of the intermediate layer 104. For example, the thickness of the outer layer 106 may be between about 6 mm and about 9 mm, and preferably about 7.5 mm in an exemplary embodiment. Other thicknesses are possible.

After the fiber layers 102, 104, 106 of the cover 72 have been positioned relative to the bushing 70, the assembly may be infused with resin and cured, as demonstrated by step 168. By way of example, an RTM process or vacuum infusion process may be used in this regard. These processes are well understood and will not be described in further detail herein. As noted above, the formation of the replacement insert 36 as described above occurs separate from the repair process described in reference to FIG. 4 above. Accordingly, the infusion and curing processes may be more carefully controlled to ensure a high quality composite structure with an excellent adhesive bond at the bushing/composite interface at the outer surface 96 of the bushing 70. After this process, the replacement insert 36 may be slightly oversized and thus additional processing steps may be implemented in order to provide the replacement insert 36 with the desired shape, dimensions and features.

Thus, in a further step 170 in accordance with the method, material may be removed from the outer surface 158 of the replacement insert 36 so as to arrive at the desired shape, dimensions and to form other additional features. In accordance with one aspect of the invention, since the composite material cover 72 of the insert 36 is substantially fully cured, then well-known processes may be used to modify the cross-sectional profile of the replacement insert 36. For example, various machining processes may be used to remove material from the outer surface of the oversized replacement insert 36 and thereby arrive at the desired shape and dimensions of the insert. In this regard, the outer surface of the oversized insert may be machined to provide the oblong cross-sectional profile as described above and illustrated in FIG. 9. Again, since the formation of the insert is done in a separate process from the repair process, the machining step (or other material removing steps) may be more carefully controlled in order to produce a high-quality replacement insert.

As noted above, during removal of material from the oversized replacement insert, additional features may be attributed to or incorporated into the insert 36. In this regard, FIGS. 7-9 illustrate a number of discrete spacers 172 projecting from the outer surface 158 of the replacement insert 36. While in one embodiment, these spacers 172 may be separate elements which are coupled to the outer surface 158 of the insert 36, in an exemplary embodiment, the spacers 172 are integrally formed in the outer surface 158. In this regard, as material is being removed from the oversized insert, such as by a controllable milling machine of the like, selected material may be spared or left behind in order to form the spacers 172. In the illustrated embodiment, the spacers 172 may be illustrated as being generally square or rectangular. For example, the spacers may have a length and width between about 3 mm and about 10 mm, and preferably are about 5 mm. It should be realized, however, that the spacers 172 may take on other sizes and shapes and remain within the scope of the invention. The spacers 172 may be used to provide a gap between the outer surface of the replacement insert 36 and the inner wall of the reconditioned bushing cavity 60. In that regard, the height of the spacers 172 may be selected to provide the desired gap. By way of example, the height of the spacers 172 may be between about 0.2 mm and about 1 mm, and preferably about 0.5 mm (FIGS. 11A and 11B). This will result in a relatively uniform gap between the outer surface 158 of the insert 36 and the walls of the reconditioned bushing cavity 36.

The arrangement of the spacers 172 on the outer surface 156 of the replacement insert 36 may vary. The arrangement is configured to provide a stable and consistent gap between the outer surface 158 of the insert 36 and the inner wall of the bushing cavity 60. In an exemplary embodiment, the arrangement may include a plurality of rows 174 along the length of the insert 36, wherein each row includes a plurality of spacers 172 distributed about the periphery of the insert 36 (e.g., in a direction transverse to the longitudinal axis of the insert). For example, the arrangement may include four rows 174a, 174b, 174c, 174d, uniformly spaced along the length of the insert 36. Each row 174 may be separated from an adjacent row by about 10 cm. This distance is exemplary and different separation distances may be possible. Additionally, in an alternative embodiment the rows 174 may be non-uniformly spaced along the length of the insert 36.

In one embodiment, there may be four spacers 172 in each of the rows 174. The spacers 172 may be uniformly distributed about the periphery of the insert 36 (and from a circumferential angle perspective). Thus, for example and in reference to rows 174b and 174d, the spacers may be positioned at 0, 90, 180, and 270 degrees about the periphery of the replacement insert 36. This is merely exemplary and other uniformly arranged spacers 172 may be possible. Alternatively, the spacers 172 may have a non-uniform distribution about the periphery of the insert 36. By way of example, the spacers 172 may be at a specified angle on either side of the first and second planar surfaces 136, 138. For example, spacers 172 may be positioned at about 30 degrees to either side of each of the planar surfaces 136, 138. Such an arrangement is shown in FIG. 7 for rows 174a and 174c, for example. Other non-uniform distributions of spacers 172 are also possible. It should be realized that the raised ridge 120 at the terminating end of the plug 74a may also operate as a spacer between the insert 36 and the wall of the reconditioned bushing cavity 60. Thus, in one embodiment, the height of the raised ridge 120 should be substantially equal to the height of the spacers 172.

As noted above, the reconditioned bushing cavity 60 is configured to have a shape and dimensions similar to the shape and dimensions of the replacement insert 36. Accordingly, the original bushing cavity 34 that remains after the extraction of the selected compromised bushing 26 may be reshaped to match the outer profile 130 of the replacement insert 36. In an exemplary embodiment, this would include forming the bushing cavity 60 to have an oblong cross-sectional profile as described above. In regard to the end face 30 of the blade 20, the amount of blade material radially inboard and outboard of the original bushing cavity 34 is not significant, and typically is less than the amount of blade material between circumferentially adjacent bushing cavities. (See FIGS. 6A and 6B). Accordingly, in an exemplary embodiment, the major axis 132 of the cross-sectional profile of the replacement insert 36 may be configured to extend generally in the circumferential direction of the root end 22 of the blade 20. With the shape, dimensions and orientation now established, the jig 44 may be used, along with the appropriate tool heads 58, to reshape the bushing cavity 34 to have the desired profile.

Figure 12A:
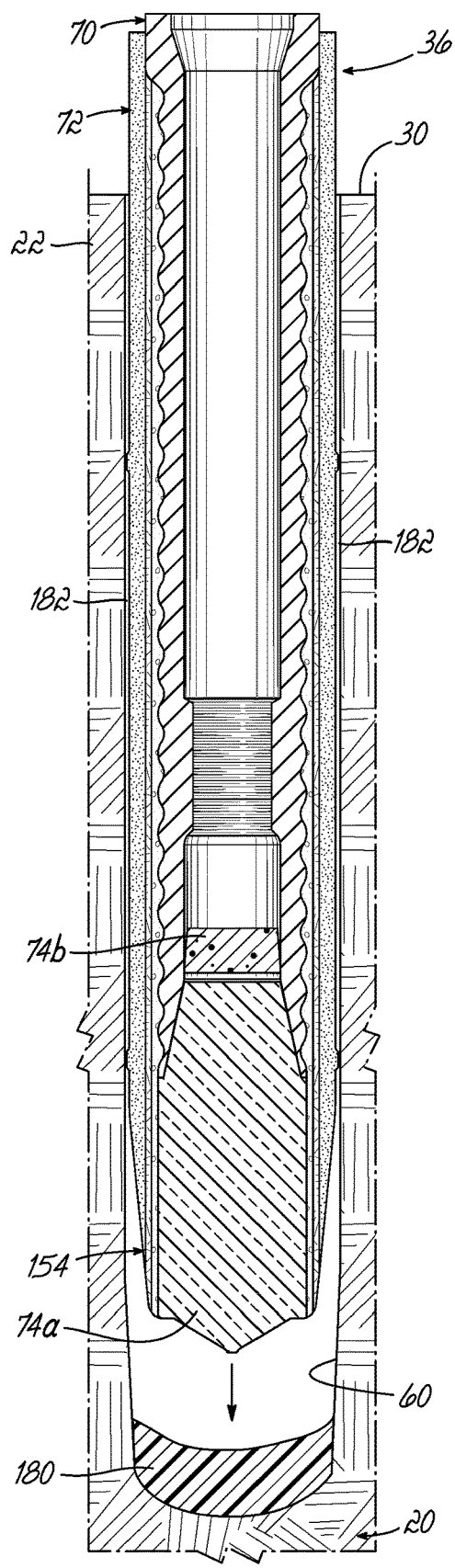
FIGS. 12A and 12B are cross-sectional views illustrating the insertion of the replacement insert into the reconditioned bushing cavity in accordance with an embodiment of the invention.
Figure 12B:
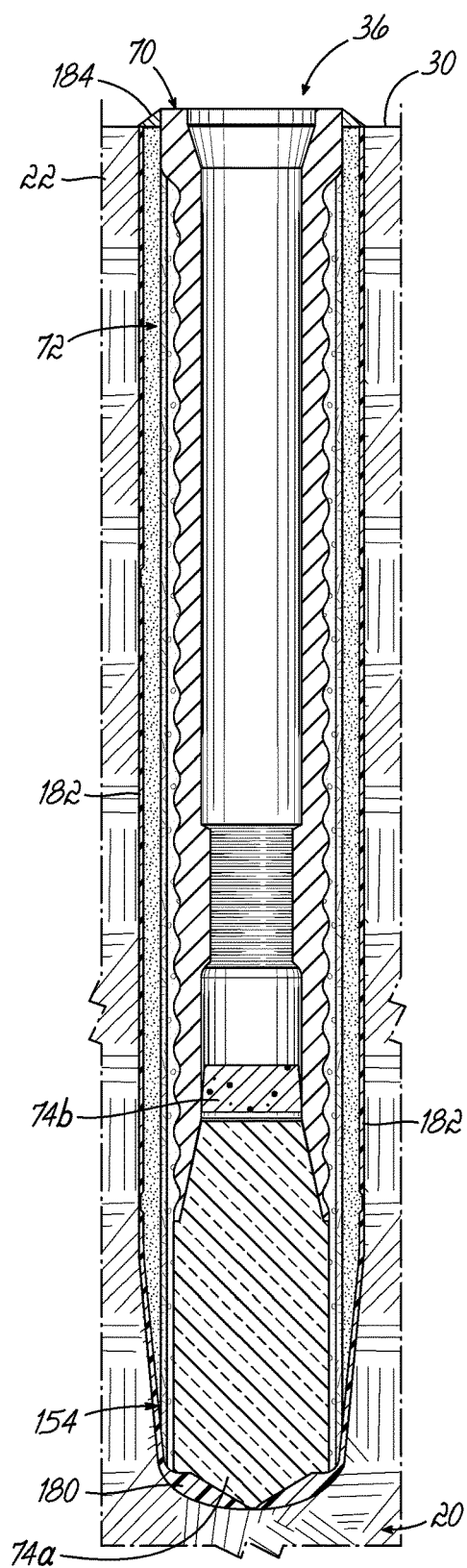

FIGS. 12A and 12B schematically illustrate the details of an exemplary method of coupling the replacement insert 36 to the blade 20, and more particularly to the reconditioned bushing cavity 60. In this regard, a certain amount of adhesive 180 may be positioned in the bottom of the bushing cavity 60. In one aspect of the invention, a precise, predetermined amount of adhesive may be determined based on the dimensions of the bushing cavity 60, the replacement insert 36, and the size of the gap or cavity 182 that is desired for the adhesive to occupy. That amount may then be deposited in the bottom of the bushing cavity 60. The replacement insert 36 may then be slowly inserted into the bushing cavity 60, with the tapered tip 154 being inserted into the bushing cavity 60 first. Of course, the orientation of the replacement insert 36 must match the orientation of the bushing cavity 60. In other words, the major axis 132 and the minor axis 134 of the replacement insert 36 must align with the major axis and minor axis of the bushing cavity 60. With the spacers 172 at the appropriate height, the insert 36 is essentially self-centering relative to the bushing cavity 60. As the tip 154 of the replacement insert 36 is moved in proximity to the bottom of the cavity 60, the insert 36 contacts the adhesive 180 and starts driving the adhesive 180 upwardly through the gap 182 and toward the end face 30 of the root end 22 of the blade 20. When the replacement insert 36 is fully seated, the raised ridge 120 engages with the bottom of the cavity 60, the spacers 172 substantially engage with the sidewalls of the cavity 60, and the adhesive 180 substantially fills the gap 182 such that the adhesive 180 is substantially flush with the end face 30 of the blade 20. The filling process described above may be particularly beneficial to prevent air pockets in the adhesive, and thereby provide an improved adhesive bond at the interface between the outer surface 158 of the insert 36 and the inner wall of the bushing cavity 60.

With the replacement insert 36 fully seated in the bushing cavity 60, the adhesive 180 may be cured, such as by heating. In this regard, a heating blanket or other type of heater may be used to facilitate curing of the adhesive 180. In an additional step, a filet of sealant 184 may be disposed around the flange 84 at the first end 78 of the bushing 70. The sealant 184 may be configured to prevent hydraulic oil or other contaminating agents from infiltrating the interface between the metal bushing 70 and the inner surface of the cover 72, and optionally between the interface between the outer surface of the cover 72 and the inner wall of the bushing cavity 60. With the seal 184 protecting the external accessibility of the sensitive bond interfaces, and the plug 74b protecting the internal accessibility of the sensitive bond interfaces, the impact of fluids (e.g., hydraulic fluids, etc.) and other contaminating agents from damaging bushings 70 may be significantly reduced.

As discussed above, once all of the contaminated bushings 26 have been repaired in the manner described above, the repaired blade 20 may be returned back to the wind turbine site and reattached to the wind turbine 10. Again, these steps are well known in the industry and will not be described further herein. It is believed that the various elements and methods outlined above represent a more cost-effective way of addressing the issue of loose and damaged bushings that hold a wind turbine blade onto a rotor hub. The cost-effectiveness of the repair method may be further increased when the repair process is implemented at the wind turbine site. In this way, the transportation costs associated with moving the blade to and from a manufacturing/repair facility may be avoided.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A replacement insert for the repair of a joint connecting a wind turbine blade to a rotor hub of a wind turbine, comprising:
    a bushing having a first end, a second end, an outer surface, and an internal passageway; and
    a cover that extends completely around a circumference of the outer surface of at least a section of the bushing, wherein the replacement insert has a non-circular cross-sectional profile and wherein the replacement insert is configured to be initially separate from the wind turbine blade and attachable to the wind turbine blade as an assembled unit after the wind turbine blade has been manufactured, and
    wherein the cover includes a plurality of layers of fibrous material, and wherein the fibers of adjacent layers are oriented in different directions.

2. A replacement insert for the repair of a joint connecting a wind turbine blade to a rotor hub of a wind turbine, comprising:
    a bushing having a first end, a second end, an outer surface, and an internal passageway;
    a cover around at least a portion of the outer surface of the bushing, the cover defining an outer surface; and
    a plurality of protrusions extending from the outer surface of the cover and configured to operate as spacers when the replacement insert is positioned in a bushing cavity in the wind turbine blade, the plurality of protrusions defining a gap between the outer surface of the replacement insert and the walls that define the bushing cavity.

3. The replacement insert according to claim 2, wherein the plurality of protrusions is formed from the same material as the cover.

4. The replacement insert according to claim 3, wherein the plurality of protrusions is integrally formed with the cover.

5. The replacement insert according to claim 2, wherein the plurality of protrusions has the same height, such that the gap between the outer surface of the insert and the walls of the bushing cavity is configured to be uniform.

6. The replacement insert according to claim 2, wherein the plurality of protrusions is arranged into a plurality of rows, each row being at a fixed position along a longitudinal axis of the bushing, and each row having a plurality of protrusions.

7. The replacement insert according to claim 6, wherein the rows are uniformly spaced apart along the longitudinal axis of the bushing.

8. The replacement insert according to claim 6, wherein the protrusions in each row are non-uniformly spaced apart about the outer surface of the insert.

9. The replacement insert according to claim 2, wherein the cover is formed from a composite material.

10. The replacement insert according to claim 9, wherein the composite material is fully cured.

11. The replacement insert according to claim 2, wherein the replacement insert has an oblong cross-sectional profile defined by a major axis and a minor axis, wherein the major axis is greater than the minor axis.

12. The replacement insert according to claim 11, wherein the cover further comprises a first planar surface, a second planar surface opposed to the first planar surface, a first arcuate surface extending between the first and second planar surfaces, and a second arcuate surface extending between the first and second surfaces and opposed to the first arcuate surface.

13. The replacement insert according to claim 12, wherein the first and second arcuate surfaces have a constant radius of curvature.

14. The replacement insert according to claim 13, wherein the constant radius of curvature is equal to the minor axis.

15. The replacement insert according to claim 2, further comprising a chamfer at a tip of the replacement insert.

16. The replacement insert according to claim 2, wherein the cover includes a plurality of layers of fibrous material.

17. The replacement insert according to claim 16, wherein the fibers of adjacent layers are oriented in different directions.

18. The replacement insert according to claim 17, wherein the fibers of each of the plurality of layers are oriented in different directions.

19. The replacement insert according to claim 16, wherein at least one of the plurality of layers includes a fiber roving, wherein the fibers of the roving are oriented in a direction perpendicular to a longitudinal axis of the bushing.

20. The replacement insert according to claim 16, wherein at least one of the plurality of layers includes a biaxial fiber sheet, wherein the fibers of the biaxial fiber sheet are oriented at +/−45 degrees relative to a longitudinal axis of the bushing.

21. The replacement insert according to claim 16, wherein at least one of the plurality of layers includes a unidirectional fiber sheet, wherein the fibers of the unidirectional fiber sheet are oriented parallel to a longitudinal axis of the bushing.

22. The replacement insert according to claim 16, wherein the plurality of layers of fibrous material further comprises:
   an inner layer of fibrous material, the inner layer including a fiber roving wrapped around the outer surface of the bushing;
   an intermediate layer of fibrous material, the intermediate layer including a biaxial fiber sheet wrapped around the inner layer; and
   an outer layer of fibrous material, the outer layer including a unidirectional fiber sheet wrapped around the intermediate layer.

23. The replacement insert according to claim 2, further comprising a plug positioned in the second end of the bushing and extending therefrom, wherein the cover is disposed around at least a portion of an outer surface of the plug.

24. The replacement insert according to claim 2, further comprising a seal disposed in the internal passageway of the bushing, wherein the seal is configured to prevent a contamination agent introduced into the passageway at the first end from reaching the second end of the bushing.

25. A replacement insert for the repair of a joint connecting a wind turbine blade to a rotor hub of a wind turbine, comprising:
   a bushing having a first end, a second end, an outer surface, and an internal passageway; and
   a cover that extends completely around a circumference of the outer surface of at least a section of the bushing,
   wherein the replacement insert includes a longitudinal axis and a non-circular oblong cross-sectional profile having a major axis and a minor axis, wherein the major axis is greater than the minor axis to define an axis ratio that is maintained along a longitudinal section of the insert that extends axially beyond the second end of the bushing and through portion of a tip of the insert.

26. The replacement insert according to claim 25, wherein the tip of the insert is tapered from the second end of the bushing to a tip end of the insert.

\* \* \* \* \*